(12) United States Patent  
James et al.

(10) Patent No.: US 6,651,958 B1  
(45) Date of Patent: Nov. 25, 2003

(54) VALVE SEAT HAVING A FRUSTO-CONICAL SHAPE

(76) Inventors: Alan David James, Home Farm, Main Street, Bruntingthorpe, Leics, LE17 2QE (GB); David Colston Beauchamp, 108 Main Street, Kinoulton, Nottingham, NG12 3EN (GB)

( * ) Notice: Subject to any disclaimer, the term of this patent is extended or adjusted under 35 U.S.C. 154(b) by 32 days.

(21) Appl. No.: 10/031,497

(22) PCT Filed: Jul. 14, 2000

(86) PCT No.: PCT/GB00/02720

§ 371 (c)(1),  
(2), (4) Date: Jan. 14, 2002

(87) PCT Pub. No.: WO01/06155

PCT Pub. Date: Jan. 25, 2001

(30) Foreign Application Priority Data

Jul. 15, 1999 (GB) ............................................. 9916514

(51) Int. Cl.⁷ .................................................. F16K 5/06
(52) U.S. Cl. ............................ 251/315.07; 251/315.16; 251/314
(58) Field of Search ............................ 251/315.01, 304, 251/315.16, 315.03, 315.07, 314

(56) References Cited

U.S. PATENT DOCUMENTS

| 3,394,915 | A |   | 7/1968  | Gachot     |            |
|-----------|---|---|---------|------------|------------|
| 4,118,009 | A | * | 10/1978 | Chmura     | 251/315.04 |
| 4,126,295 | A |   | 11/1978 | Natalizia  |            |
| 4,269,391 | A | * | 5/1981  | Saito et al. | 251/315.03 |
| 4,457,491 | A |   | 7/1984  | Dudman     |            |
| 4,502,663 | A |   | 3/1985  | Huber      |            |
| 4,696,323 | A | * | 9/1987  | Iff        | 251/315.13 |
| 4,750,708 | A |   | 6/1988  | Yusko, Jr. et al. |     |
| 4,968,000 | A | * | 11/1990 | Hubertson et al. | 251/315.04 |

FOREIGN PATENT DOCUMENTS

| DE | 4339587 A | 6/1985  |
| GB | 1356707 A | 6/1974  |
| GB | 1577807 A | 10/1980 |
| GB | 2105823 A | 3/1983  |
| GB | 2189577 A | 10/1987 |
| GB | 2213236 A | 8/1989  |
| JP | 1058874 A | 3/1989  |

* cited by examiner

Primary Examiner—Ehud Gartenberg  
Assistant Examiner—John Bastianelli  
(74) Attorney, Agent, or Firm—Akerman Senterfitt

(57) ABSTRACT

A valve including an at least partially spherical valve control member and a valve seat where the valve control member is rotatable within a valve housing to obturate and to open at least one opening of the housing by bringing a passage through the valve control member out of and into alignment with the opening. The valve seat includes a radially outer disc portion which lies in a plane transverse to an axis of the opening and a radially inner generally frusto-conical, annular extension free at its narrower-diameter end. The frusto-conical extension is adapted to lie in the opening with a larger-diameter end inward of the housing, and to make substantially a line contact with an at least partially spherical surface of the valve control member when the latter obturates the opening. The disc portion is supported by the housing in such manner that a radially inner region of the disc portion and the frusto-conical extension are capable of flexing in response to movement of the valve control member outward and inward of the housing. The line contact moves relative to the frusto-conical extension but is at all times at a position where the radially outer disc portion is supported by the housing.

7 Claims, 2 Drawing Sheets

VALVE SEAT HAVING A FRUSTO-CONICAL SHAPE

Figure 1:
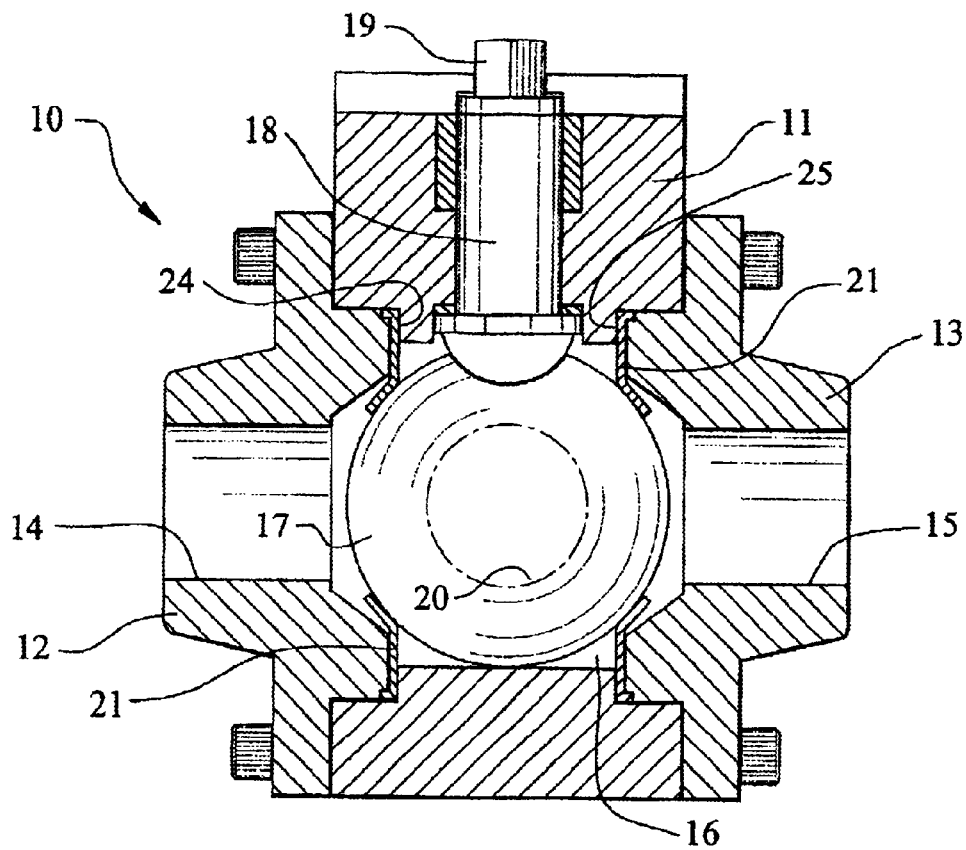

This invention relates to a valve, and more particularly to an improved valve of the kind which has a spherical or part-spherical valve closure member operated through 90° from the fully closed position to the full open position or vice versa.

Valves with spherical or part-spherical valve closure members are used extensively in the hydrochemical and beverage industries because of their relative ease of operation, their improved sealing characteristics, the fact that no mineral lubrications are needed to reduce operating torques and assist sealing and because problems related to line product contamination are reduced. In recent years the annular valve seat which works in conjunction with other valve control members has mainly been made from polytetrafluoroethylene (PTFE), this presenting a low friction operation on a firm surface to the valve control member. In many applications a valve seat of polymer materials may be suitable, but PTFE is preferred because of the ability to produce positive isolation with low operating torques and the general acceptance of the compatible nature of the PTFE when in contact with many hydrochemical and beverage applications.

The disadvantage of PTFE seated valves is that pressure and temperature can exceed the mechanical properties of the polymer seat construction which normally starts to occur around 230° C. With increasing temperatures beyond 230° C. the material will start to decompose. With extreme heat such as direct fire on the valve the PTFE seat will vaporise requiring the valve to have an emergency secondary metal backup seat incorporated in the internal seat housings. This is not an optimum solution because the closed valve control member will not engage on the secondary metal seat until the PTFE has fully vaporised, allowing the valve control member to re-seat onto the secondary emergency metal seat and constrain further line media from passing through the valve. If the heat around the valve is not sufficient fully to vaporise and decompose the PTFE seat a partial destruction of the PTFE seat will result and restrict the valve control member from sealing on the secondary emergency metal seat with the line media continuing to pass through the valve.

Other problems associated with PTFE seats are the vulnerability to damage or erosion from particles or solids suspended in the media passing through the valve. Valves with plug type valve control members suffer from high operating torques and rely on lubrication to reduce the torque and also assist the sealing. The disadvantage of this principle is that many types of media, such as liquid gasses and chemical solvent, dissolve the lubrication which has to be replaced at frequent intervals.

A principal object of the present invention is to improve upon known valves by providing a valve which will operate substantially without lubrication and will be substantially unaffected by the combination of high temperatures and pressures. Another object of the invention is to provide a valve of the kind having a spherical or part-spherical valve control member which will be relatively cheap and simple both to manufacture and to assemble and which will be relatively maintenance free in use and which will be versatile in its applications in the hydrochemical and beverage industries.

In accordance with one aspect of the present invention there is provided a valve having a spherical or part-spherical valve control member, the control member being rotatable within a valve housing to obturate or to open at least one opening of the housing by bringing a passage through the valve member out of or into alignment with said opening and a valve seat consisting of a radially outer disc portion which lies in a plane transverse to the axis of said opening and a radially inner generally frusto-conical, annular extension free at its narrower-diameter end and meeting the disc portion over a corner, the frusto-conical extension being adapted to lie in said opening with its larger-diameter end inward of the housing and to make substantially a line contact with the spherical or part-spherical surface of the valve member when the latter obturates said opening, the disc portion being supported by the housing in such manner that a radially inner region of the disc portion is capable of flexing.

Preferably said extension is resilient and the arrangement is such that the valve member tends to expand the extension in the assembled condition of the valve and/or when the valve member obturates said opening.

Preferably the extension of the valve seat is of metal, such as high nickel alloy steel.

Preferably the disc portion is supported by being gripped only at an outer periphery thereof, whereby an inner peripheral region of the disc is free to deform.

The valve may have a part-spherical valve control member and the axis of rotation of the valve control member is preferably offset from the center of the sphere on which the part-spherical surface of the valve control member lies toward the said opening such that as the valve member moves toward the opening-obturating position it tends to expand the extension of the valve seat.

Alternatively the valve may have a spherical valve control member through which a passage is formed, said passage aligning with openings on opposite sides of the valve housing when the control member is rotated to the valve-open position, each said opening containing a said valve seat and the dimensions of the valve housing may be such relative to the diameter of the sphere of the control member that when the valve is assembled the extensions of both of the valve seats tend to be expanded by the valve control member at least in the obturating position of the latter.

The or each said valve seat may be made by spinning into a frusto-cone an inner peripheral region of an annular disc of high nickel alloy steel.

Figure 2:
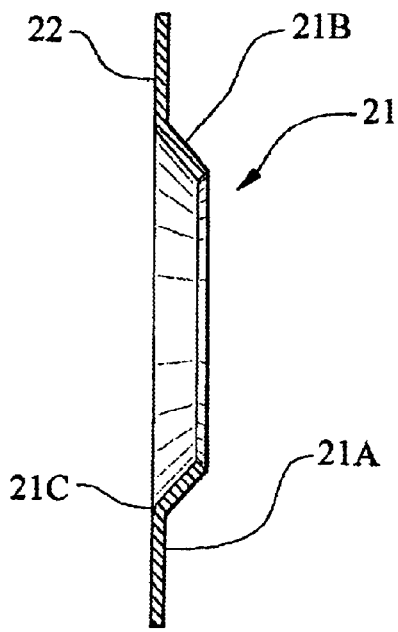
Figure 3:
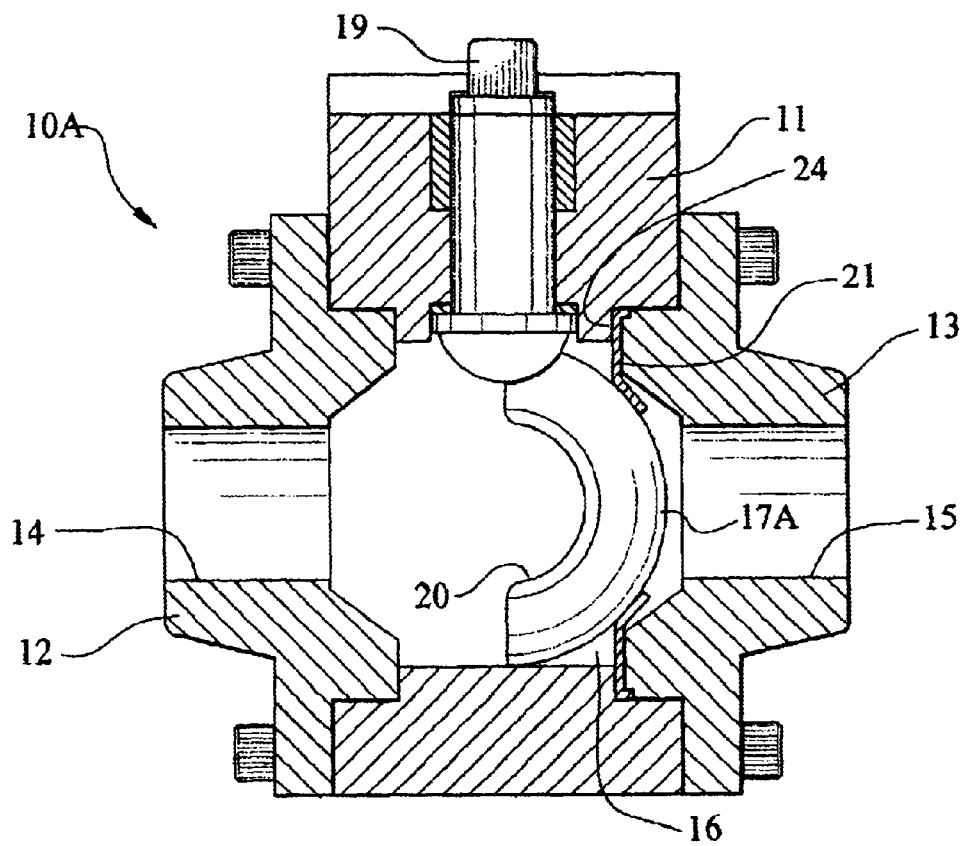
Figure 4:
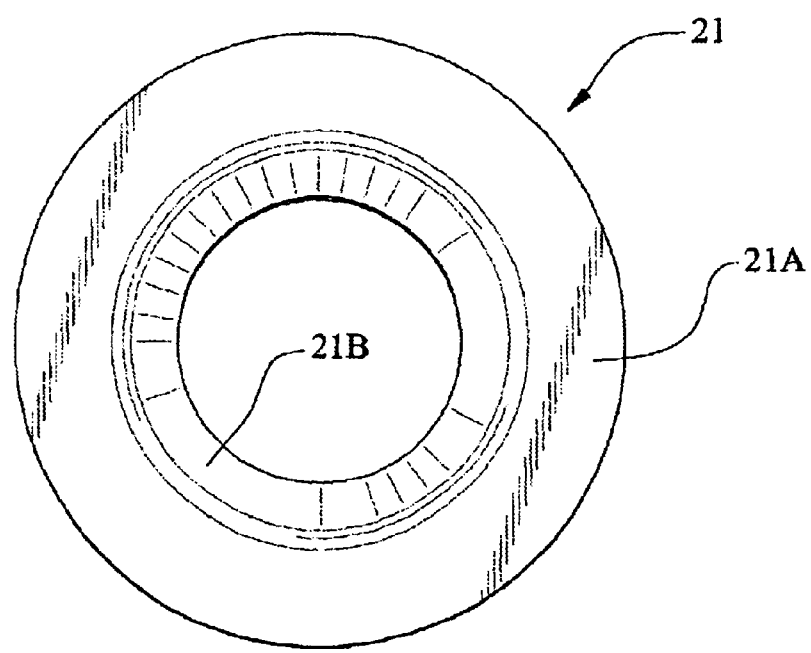

Preferred embodiments of the present invention will now be described with reference to the accompanying drawings, in which:

FIG. 1 is a sectional elevation of a valve having a spherical valve control member, FIG. 2 is a side elevation on an enlarged scale of one of the valve seats used the valve of FIG. 1, FIG. 3 is a sectional elevation of a valve having a part-spherical valve control member, and FIG. 4 is a front view on an enlarged scale of the valve seat of the valve of FIG. 3.

FIG. 1 illustrates a valve 10 having a housing 11 onto opposite sides of which are bolted flanges 12 and 13 whereby the valve may be included in a pipeline (not shown). Coaxial bores 14 and 15 of the flanges open at their inner ends to a chamber 16 within housing 11 in which a spherical valve control member 17 is located. A stem 18 has a flat which engages in a groove or slot in the control member 17 and extends upwardly through the housing 11 to terminate outside the housing in a nut 19 which can be engaged by a spanner to rotate the member 17 about a vertical axis transverse to the common axis of the bores 14 and 15. A passage 20 penetrates the spherical member 17. When this passage 20 is aligned with the bores 14 and 15 the valve is open and fluid can flow through the pipeline in which the valve is included. As the member 17 is rotated to the position shown, in which the passage 20 is generally perpendicular to the common axis of the bores 14 and 15, the openings of the flanges 12 and 13 to the chamber 16 of the valve housing are progressively obturated until the valve is fully closed.

As so far described the valve is conventional. In accordance with the present invention, however, there is positioned in the opening of each flange 12 and 13 to the chamber 16 of the valve housing 11 a valve seat 21 as shown in isolation in FIGS. 2 and 4. Each valve seat 21 is made by spinning an inner peripheral region of an annular disc 22 of high nickel alloy steel into an annular frusto-cone 21B. The dimensions of each valve seat 21 are such in relation to the diameter of the spherical valve control member 17 that in the assembled condition of the valve 10 each frusto-cone will be substantially tangential to the spherical periphery of member 17 so as to make substantially a line contact therewith.

As will be clear from FIG. 1 the radially outer, disc portions 21A of two valve seats 21 are gripped between the flanges 12 and 13 and annular rebates 24 and 25 of the housing 11 when the flanges are bolted to the housing. However the rebates 24 and 25 stop short of the confronting surfaces of the flanges so that the disc portion 21A of each valve seat 21 is gripped only at an outer peripheral region thereof. This allows for some deformation of an inner peripheral region of the disc portion 21A adjacent a corner 21C over which it meets the frusto-conical extension 21B under the compressive force exerted on the outer peripheral region of the disc.

The dimensions of the components of valve 10 are chosen such that as the flanges 12 and 13 are bolted to housing 11 the control member 17 applies pressure to the frusto-conical extensions 21B of the valve seats 21, tending to expand them. This pre-stressing of the valve seats 21 ensures that a firm contact is maintained between the valve seats 21 and the valve control member 17. Moreover, and as is known per se the aforedescribed connection between the valve member 17 and its stem 11 is such that the valve member 17 can be moved downstream by the fluid pressure behind it when the valve is closed. This enables the valve member 17 to maintain pressure on the downstream valve seat 21.

The valve 10A illustrated in FIG. 3 is generally similar to the valve 10 of FIG. 1 and like parts have like reference numerals. However the spherical valve control member 17 is here replaced by a part-spherical valve control member 17A adapted to obturate only one of the openings from the bores 14 and 15 to the chamber 16, and only this opening contains a valve seat 21. As is known per se the outer periphery of the member 17A lies on a sphere and the inner periphery 25 of the member 17A is cut away so that when member 17A is rotated to the valve-open position a clear passage is provided between the bores 14 and 15. As is also known per se the axis about which the member 17A is rotated when nut 19 is turned is preferably offset from the center of the sphere on which lies the outer periphery of member 17A toward the opening of flange 13 into chamber 16 so that as the member 17A obturates the opening it also stresses the valve seat 21.

Because there is only line contact between the valve seats 21 and the associated spherical or part-spherical surface of a control member 17 or 17A there is no excessive resistance to turning the valve on or off even though the pre-stressed seat or seats 21 maintain firm contact with the control member. An all-metal valve will withstand temperatures which would destroy a PTFE valve seat or some analogous form of lubrication and the elimination of a lubricated lining or valve seat avoids the danger that relatively soft surfaces will become impregnated with impurities or will become abrasive. The valve of the present invention is therefore both safer for use in petro-chemical industry, where high temperatures may be encountered and more hygienic and less prone to failure when used in the food industry.

Although the valve of the invention may be described as non-lubricated the possibility is not ruled out of plating or otherwise treating the surface of a valve seat 21 which will confront a valve control member with a substance which will improve characteristics of the high nickel alloy metal such as hardness or slipperiness.

The fact that the valve seat 21 consists only of a flat disc portion lying in a plane perpendicular to the axis of the passage through the valve and a radially inner frusto-conical portion integral with the disc portion and meeting it over a corner makes for a very simple construction very easy to manufacture. At the same time the way in which the disc portion 21A is gripped only at its outer peripheral region enables the valve seat as a whole to flex under load.

What is claimed is:

1. A valve, comprising:

an at least partially spherical valve control member;

a valve seat;

wherein said valve control member is rotatable within a valve housing to obturate and to open at least one opening of said housing by bringing a passage through said valve control member out of and into alignment with said opening;

wherein said valve seat includes a radially outer disc portion which lies in a plane transverse to an axis of said opening and a radially inner generally frusto-conical, annular extension free at its narrower-diameter end;

wherein said frusto-conical extension is adapted to lie in said opening with a larger-diameter end inward of said housing, and to make substantially a line contact with an at least partially spherical surface of said valve control member when the latter obturates said opening;

wherein said disc portion is supported by said housing in such manner that a radially inner region of said disc portion and said frusto-conical extension are capable of flexing in response to movement of said valve control member outward and inward of said housing;

wherein said line contact moves relative to said frusto-conical extension but is at all times at a position where said radially outer disc portion is supported by said housing.

2. A valve as claimed in claim 1, wherein said frusto-conical extension is resilient and arranged such that said valve control member tends to expand said frusto-conical extension in an assembled condition of said valve and when said valve control member obturates said opening.

3. A valve as claimed in claim 2, wherein the extension of said valve seat includes metal.

4. A valve as claimed in claim 3, wherein said frusto-conical extension of said valve seat includes high nickel alloy steel.

5. A valve as claimed in claim 1, wherein an axis of rotation of said valve control member is offset from a center of a sphere on which said at least partially spherical surface of said valve control member lies toward said opening of said housing such that as said valve control member moves toward an opening-obturating position it tends to expand said frusto-conical extension of said valve seat.

6. A valve as claimed in claim 1, said passage aligning with said openings on opposite sides of said housing when said valve control member is rotated to a valve-open position, each said opening containing said valve seat and dimensions of said housing being such relative to sphere diameter of said valve control member that when said valve is assembled said frusto-conical extensions of both of said valve seats tend to be expanded by said valve control member at least in an obturating position of the latter.

7. A valve as claimed in claim 1, wherein said valve seat is made by spinning into a frusto-cone an inner peripheral region of an annular disc of high nickel alloy steel.

* * * * *